(12) United States Patent
Nishio

(10) Patent No.: US 8,922,677 B2
(45) Date of Patent: Dec. 30, 2014

(54) IMAGE PROCESSING APPARATUS AND IMAGING APPARATUS FOR COMBINING IMAGE FRAMES

(71) Applicant: Canon Kabushiki Kaisha, Tokyo (JP)

(72) Inventor: Akihiro Nishio, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 98 days.

(21) Appl. No.: 13/840,416

(22) Filed: Mar. 15, 2013

(65) Prior Publication Data

US 2013/0265464 A1 Oct. 10, 2013

(30) Foreign Application Priority Data

Apr. 5, 2012 (JP) .................................. 2012-086563

(51) Int. Cl.
*H04N 5/262* (2006.01)
*G03B 13/00* (2006.01)
*H04N 5/232* (2006.01)

(52) U.S. Cl.
CPC ......... *H04N 5/2621* (2013.01); *H04N 5/23212* (2013.01)
USPC ......................................... 348/239; 348/345

(58) Field of Classification Search
CPC H04N 5/23212; H04N 5/2621; H04N 5/2355
USPC ......... 348/239, 280.4, 218.1, 345–356, 222.1
See application file for complete search history.

(56) References Cited

U.S. PATENT DOCUMENTS

| 6,829,008 | B1 | 12/2004 | Kondo et al. | |
|---|---|---|---|---|
| 2008/0158258 | A1* | 7/2008 | Lazarus et al. | 345/634 |
| 2011/0096179 | A1* | 4/2011 | Border et al. | 348/208.4 |
| 2012/0026365 | A1* | 2/2012 | Shinoda | 348/231.99 |
| 2013/0002952 | A1* | 1/2013 | Nakayama | 348/500 |

FOREIGN PATENT DOCUMENTS

| JP | 01-216306 A | 8/1989 |
|---|---|---|
| JP | 3592147 B2 | 11/2004 |
| JP | 2006-261929 A | 9/2006 |
| JP | 2009-207012 A | 9/2009 |

* cited by examiner

*Primary Examiner* — Mekonnen Dagnew
(74) *Attorney, Agent, or Firm* — Canon USA Inc. IP Division

(57) ABSTRACT

An imaging apparatus including an imaging unit configured to acquire an image signal of an object includes a first image combining unit configured to align and synthesize a plurality of image frames generated from the signal output from the imaging unit at a predetermined accuracy to acquire a synthesized image for focus detection evaluation, and a second image combining unit configured to align and synthesize a plurality of image frames generated from the signal output from the imaging unit at an accuracy lower than the accuracy by the first image combining unit to acquire a synthesized image for recording.

10 Claims, 9 Drawing Sheets

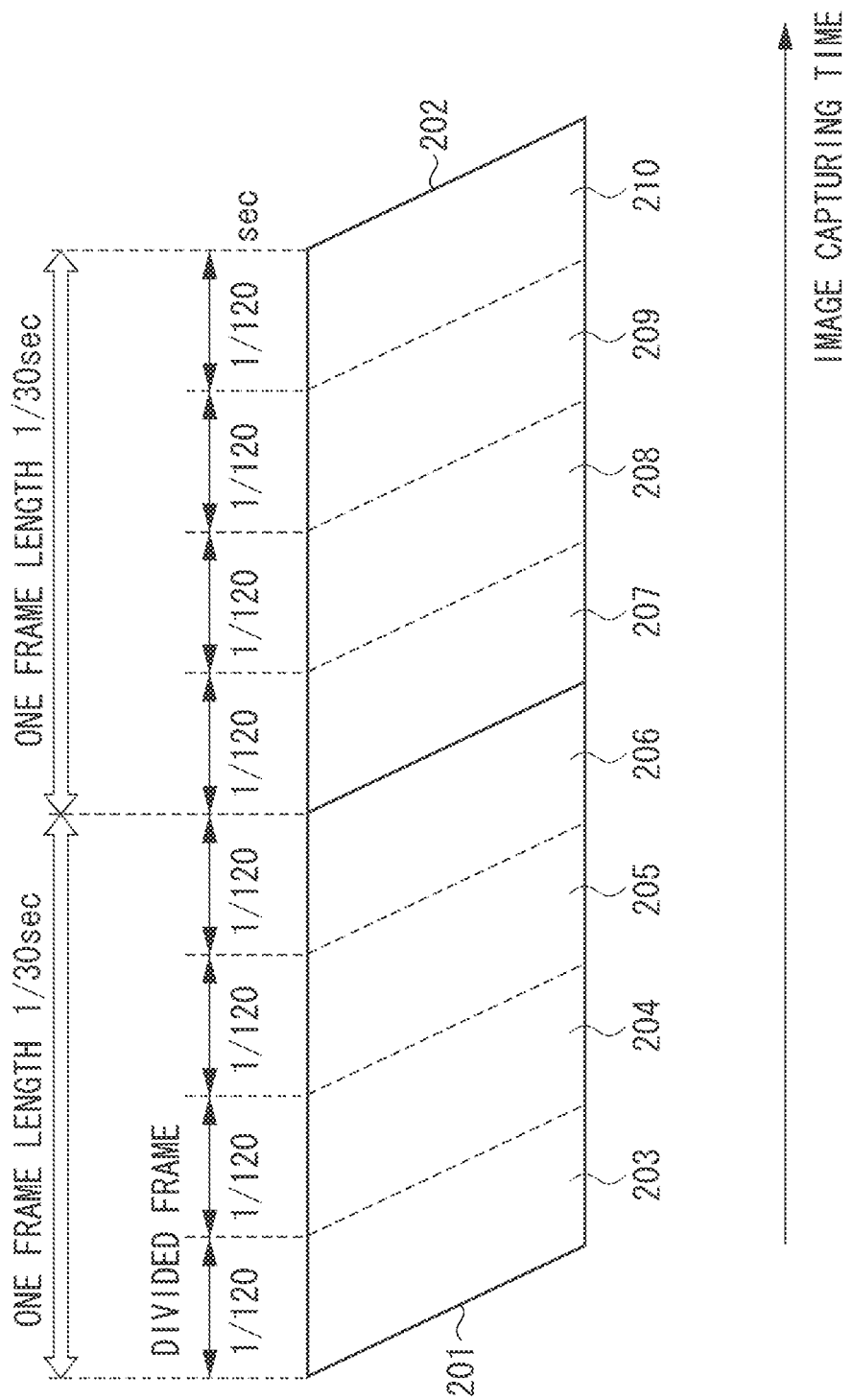

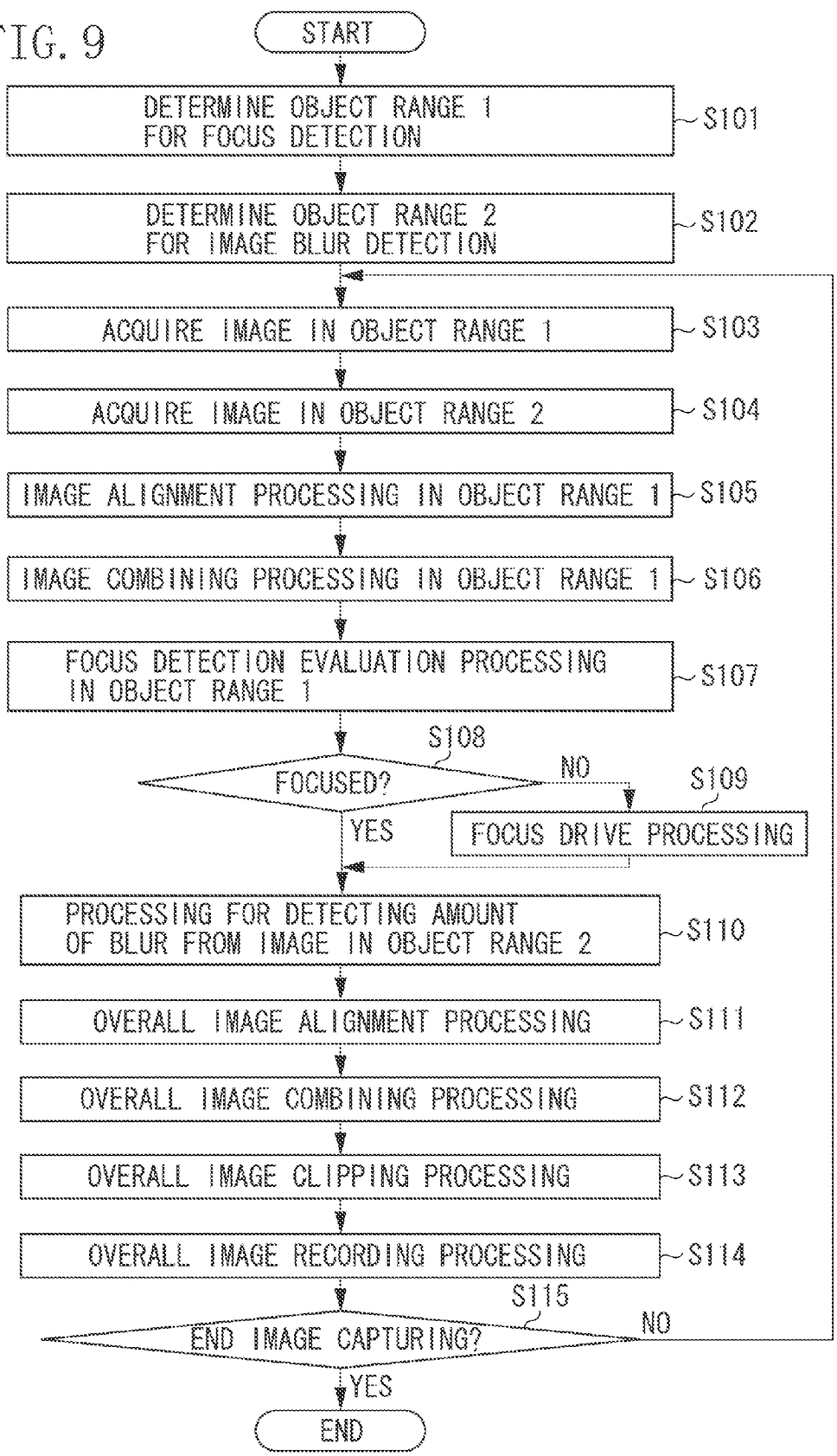

IMAGE PROCESSING APPARATUS AND IMAGING APPARATUS FOR COMBINING IMAGE FRAMES

BACKGROUND OF THE INVENTION

1. Field of the Invention

The present disclosure relates to image processing apparatuses and imaging apparatuses for combining a plurality of frames in alignment processing.

2. Description of the Related Art

In video recording with a digital camera or a digital video camera that serves as an imaging apparatus, there is a method of performing automatic focus processing by aligning image positions to correct an image blur at the frame rate when recording the images, and performing a focus detection evaluation with the aligned image. In such a method, it is not possible to perform the image blur correction processing within the time which is shorter than the frame rate time when recording the images. Consequently, high-frequency components in the spatial frequencies of the object image are lost, and therefore the high-accuracy focus detection evaluation may not be performed.

To ensure the high-frequency spatial frequency components by shortening the image blur time period, there is a method of ensuring an image signal capable of performing the high-accuracy focus detection evaluation by performing an alignment combining process of images obtained by shortening the frame length. In such a method, if the obtained images are used as recording images, the sharpness of the images in one frame can be increased.

However, the method visually emphasizes the image changes between previous and subsequent frames of a captured and recorded image. As a result, the changes in the object discretely (digitally) appear, and this causes unnatural images, which is problematic.

As an example of the combination of image signals, Japanese Patent Application Laid-Open No. 2006-261929 discusses a method of adding a plurality of vertical direction pixels or horizontal direction pixels to use the resultant for a focus detection evaluation.

The control method discussed in Japanese Patent Application Laid-Open No. 2006-261929 is, however, for simply adding the simultaneously generated image signals to ensure the luminance level. Consequently, the control method disclosed in Japanese Patent Application Laid-Open No. 2006-261929 is a control method for performing image blur correction, and the method is not a control method for performing a focus detection evaluation using high-frequency components of an object image. As a result, in the control method discussed in Japanese Patent Application Laid-Open No. 2006-261929, accurate focus detection cannot be performed.

SUMMARY OF THE INVENTION

The present disclosure is directed to an apparatus and a method capable of obtaining high quality images for recording while increasing the focus detection accuracy.

According to an aspect of the present disclosure, an image processing apparatus includes an image acquisition unit configured to acquire an image from an imaging unit for acquiring an image signal from an object, a first image combining unit configured to align and synthesize a plurality of image frames acquired by the acquisition unit at a predetermined accuracy, wherein a synthesized image acquired by the first image combining unit is used for focus detection, and a second image combining unit configured to align and synthesize a plurality of image frames acquired by the imaging unit at an accuracy lower than the accuracy of the first image combining unit, or synthesize the plurality of image frames without performing alignment processing, wherein a synthesized image acquired by the second image combining unit is recorded or displayed as a captured image.

According to another aspect of the present disclosure, a method of controlling an image processing apparatus configured to perform image processing on a plurality of image frames captured by an imaging apparatus including an imaging unit configured to acquire an image signal of an object, includes a first image combining step for aligning and combining image frames acquired by the imaging unit at a predetermined accuracy, wherein a synthesized image acquired in the first image combining step is used for focus detection, and a second image combining step for aligning and combining a plurality of image frames acquired by the imaging unit at an accuracy lower than the accuracy in the first image combining step, or combining a plurality of image frames without performing alignment processing, wherein a synthesized image acquired in the second image combining step is recorded or displayed as a shot image.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the disclosure.

FIG. 5 is a diagram illustrating a state where readout processing is performed on divided frames.

FIG. 9 is a flowchart illustrating an operation according to an exemplary embodiment.

DESCRIPTION OF THE EMBODIMENTS

Various exemplary embodiments, features, and aspects of the disclosure will be described in detail below with reference to the drawings.

Hereinbelow, an imaging apparatus according to an exemplary embodiment of the present disclosure is described with reference to attached drawings.

Figure 1:
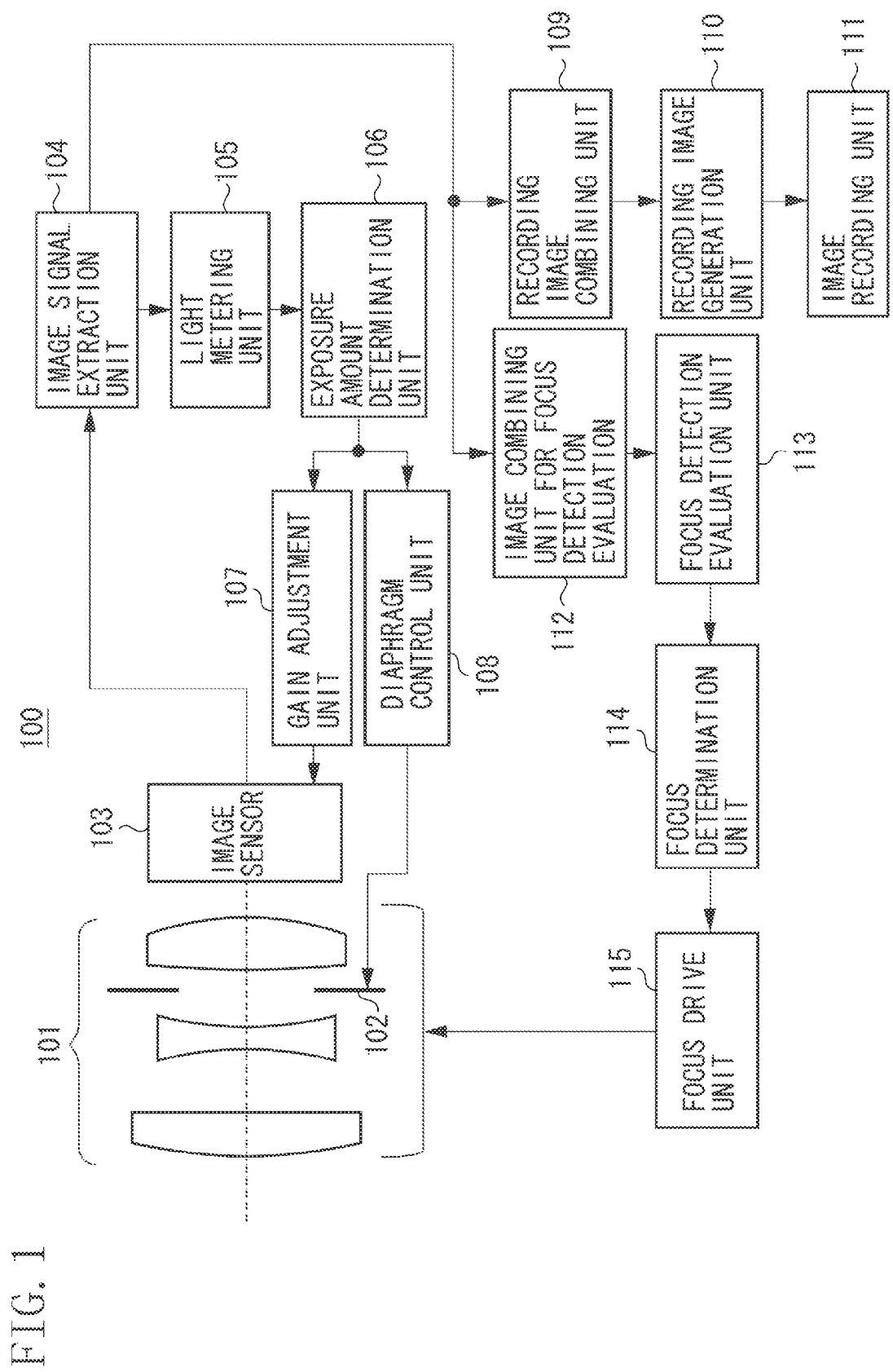
FIG. 1 is a block diagram illustrating a schematic configuration of an imaging apparatus according to an exemplary embodiment of the present disclosure.

FIG. 1 is a block diagram illustrating a schematic configuration of an imaging apparatus according to the exemplary embodiment of the present disclosure.

In an imaging apparatus 100 in FIG. 1, an imaging optical system 101 is an optical system including a plurality of lens groups and configuring an imaging optical system.

An iris diaphragm 102 is disposed in the imaging optical system 101. The blades of the iris diaphragm 102 are controlled by a diaphragm control unit 108, and the size of the aperture is controlled.

An image sensor 103 serves as an imaging unit. The image sensor 103 photoelectrically converts an optical image on an imaging surface to converts the image into an image signal. An image signal extraction unit 104 generates, from the photoelectrically-converted signal output from the image sensor 103, a recording image signal and a focus detection evaluation image signal whose image region ranges are different. A light metering unit 105 performs light metering and evaluation of the image regions to the recording image signal and focus detection evaluation image signal generated in the image signal extraction unit 104.

An exposure amount determination unit 106 calculates a proper amount of exposure for the recording image based on the light metering result of the light metering unit 105. A gain adjustment unit 107 adjusts the amplitude of the output signal of the image sensor 103 so that the image generated from the recording image signal generated in the image signal extraction unit 104 becomes a proper exposure state.

The exposure amount determination unit 106 also gives an instruction for causing the diaphragm control unit 108 to adjust the size of the aperture. The exposure amount determination unit 106 performs feedback control so that an optimal exposure amount state is achieved according to a change of the photoelectrically-converted signal from the image sensor 103.

The image signals acquired from the image signal extraction unit 104 are output, for each predetermined number of frames, to an image combining unit for focus detection evaluation 112 and a recording image combining unit 109 respectively. The recording image combining unit (second image combining unit) 109 synthesizes (combines) images of the predetermined number of frames. The predetermined number of frames is defined so that accuracy in the alignment processing is lower than the accuracy in the image combining unit for focus detection evaluation 112. Alternatively, the recording image combining unit 109 synthesizes the predetermined number of frames without performing the alignment processing. The image combining unit for focus detection evaluation (first image combining unit) 112 generates a synthesized image (a combined image) for focus detection evaluation.

A focus detection evaluation unit 113 calculates a defocus value or a contrast value with respect to the synthesized image for focus detection evaluation acquired by the image combining unit for focus detection evaluation 112. A focus determination unit 114 determines whether a current focus state is in an in-focus state with respect to the synthesized image for focus detection evaluation acquired by the image combining unit for focus detection evaluation 112.

A focus drive unit 115, according to the result of the focus determination unit 114, if necessary, performs focus control, for example, by driving a focus lens in the imaging optical system 101.

The focus drive unit 115 repeats the focus control processing (processing to move the focus lens) using images captured after the execution of the focus control processing to maintain the in-focus state.

A recording image generation unit 110 generates a synthesized image for recording from the synthesized images generated in the recording image combining unit 109. An image recording unit 111 records the synthesized image for recording generated by the recording image generation unit 110 in a recording medium such as a flash memory and a hard disk.

Figure 2:
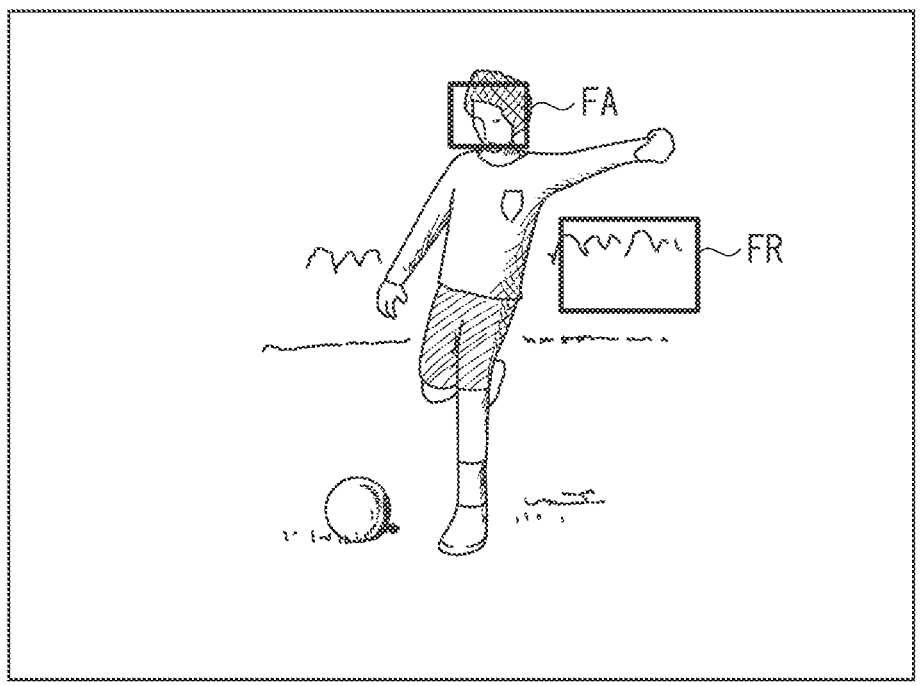
FIG. 2 is a diagram illustrating an example object.

FIG. 2 is a diagram illustrating an example object according to the exemplary embodiment.

In FIG. 2, a first image evaluation range FA is a range to which the focus detection processing is to be performed. In FIG. 2, the first image evaluation range FA is set to a range of the face of a person that is a moving object.

In FIG. 2, a second image evaluation range indicated as a second image evaluation range FR is set for observation of the background in a motionless state.

The focus detection calculation method used in the exemplary embodiment includes two main methods.

A first focus detection calculation method employed in the present exemplary embodiment is a contrast detection method. In the contrast detection method, a modulation drive is applied to the focus lens and the image sensor 103 to slightly change the in-focus state, and based on the contrast value change of the focus detection evaluation image, determination of the in-focus state is performed.

A second focus detection calculation method employed in the present exemplary embodiment is an imaging surface phase difference method. The focus detection calculation method of the imaging surface phase difference method is discussed, for example, in Japanese Patent Application Laid-Open No. 01-216306, and Japanese Patent No. 3592147. In the imaging surface phase difference method, a part of or the whole of an image sensor is used as focus detection pixels, and a phase difference detection is performed using a pair of image signals to detect an in-focus state.

In the focus detection method described below, either of the two focus detection methods can be employed.

In the object illustrated in FIG. 2, when a user performs video recording by focusing a person that is a moving object, the following problems (1) and (2) occur.

(1) At a frame rate of a long time period per unit (low frame rate), depending on the movement of a person, the image is captured in a skewed state, and high-frequency spatial frequency components are lost. As a result, it is not possible to perform highly accurate focus detection according to the contrast evaluation method and the phase difference method.

(2) In capturing an image of a person, there are image blur components due to the movement of the person, and image blur components due to the camera shake. Consequently, it is not possible to perform correct image blur correction to the blur components due to camera shake.

To solve the problems of (1) and (2), in the present exemplary embodiment, in the object like that illustrated in FIG. 2, image combining processing with image alignment processing for evaluating a focus detection in the first image evaluation range FA (the person who is the main object) is performed.

To the second image evaluation range FR, image combining processing different from that in the first image evaluation range FA (the person who is the main object) is performed. In the image combining processing to the second image evaluation range FR, an image suitable at a reproduction frame rate for the recording image is acquired.

The processing provides the synthesized image of the fast-moving object in which the image blur is reduced and being prevented from loss of high-frequency spatial frequency components. Consequently, the focus detection can be performed using the sharp object image information, and highly accurate focusing operation can be performed.

If the aligned and synthesized image for focus detection is used as a recording image, however, a new problem occurs. With reference to FIGS. 3A, 3B, 4A, and 4B, the problem is described.

Figure 3A:
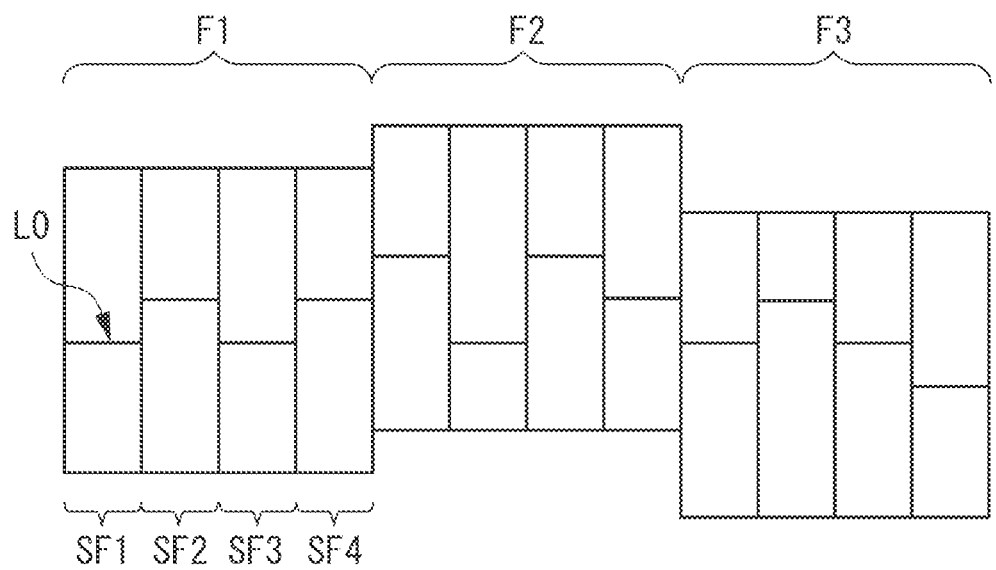
FIGS. 3A and 3B are diagrams illustrating example line segment images in a state where alignment processing is not performed among the divided frames and in a state where the alignment processing is performed among the frames.
Figure 3B:
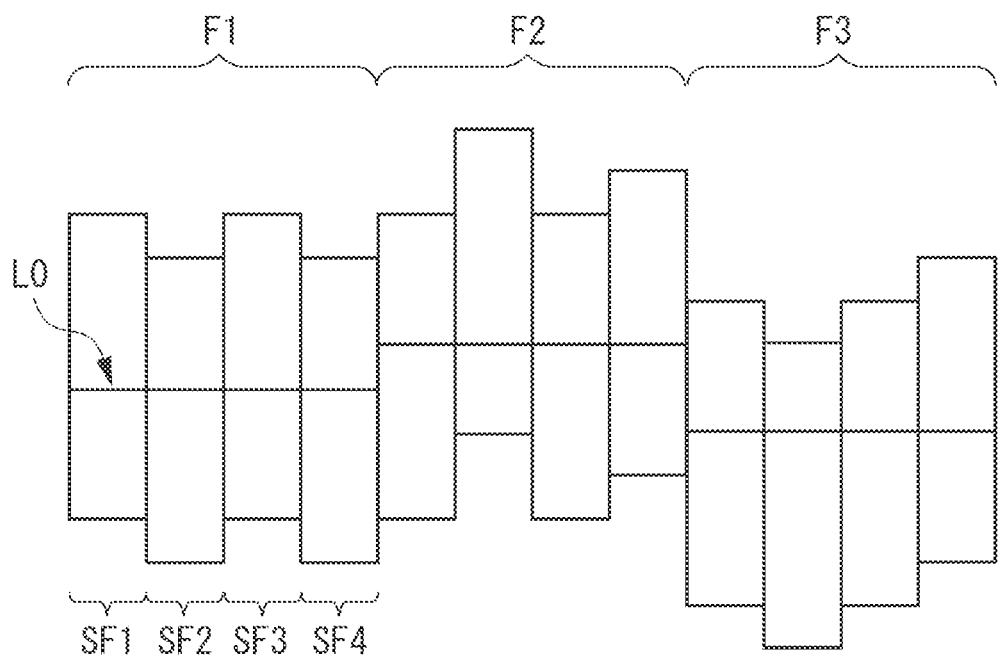

FIGS. 3A and 3B briefly illustrate states of the divided frames. Frames F1 to F3 each illustrate one image frame for recording. Frames SF1 to SF4 illustrate divided frames obtained by time-sequentially dividing the one image frame into four frames.

Figure 4A:
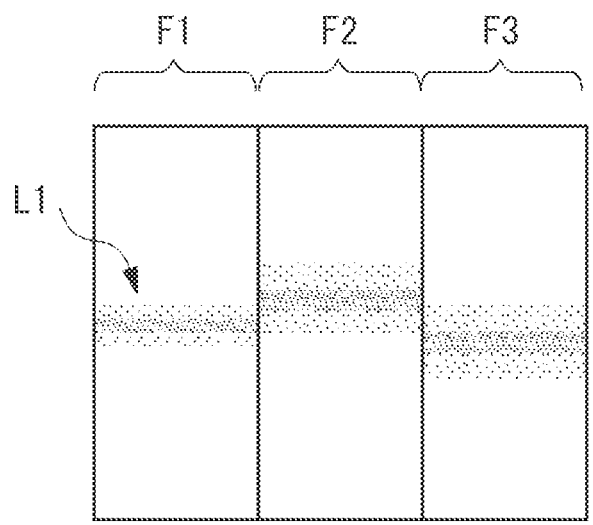
FIGS. 4A and 4B are diagrams illustrating states where image combining processing is performed on one frame for recording in a case where the alignment processing is not performed and in a case where the alignment processing is performed.
Figure 4B:
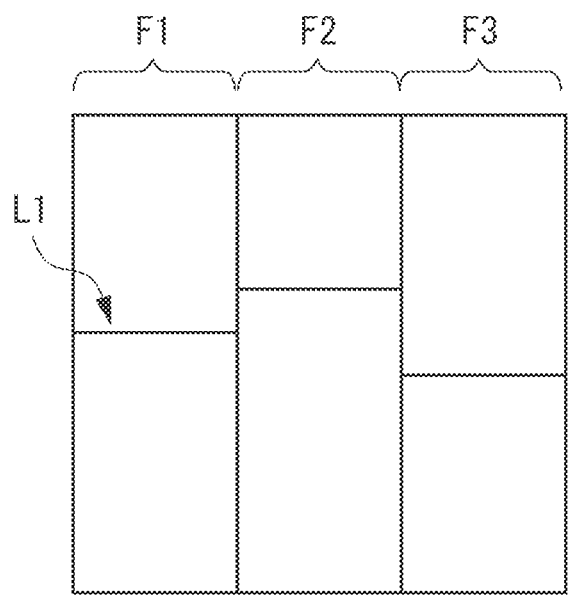

FIGS. 4A and 4B each illustrate one frame for recording obtained by combining the divided frames in FIGS. 3A and 3B under different conditions respectively.

In the present exemplary embodiment, for the sake of simplicity, it is assumed that the object image to be evaluated is a simple horizontal segment image L0 in which an object image blur (or deviation) in the vertical direction occurs in the first image evaluation range FA.

Further, it is assumed that the focus detection evaluation is performed for the first frame F1, the second frame F2, and the third frame F3 in the drawing that are recording one frame units obtained by combining the divided frames SF1 to SF4 respectively. The divided frames correspond to a plurality of image frames according to the present exemplary embodiment.

FIG. 3A illustrates a state where the alignment processing of the horizontal segment images L0 of the divided frames SF1 to SF4 used for the focus detection is not performed. In FIG. 4A, a synthesized image L1 indicates the change of the sates of the horizontal segment image L0 after the image combining processing is performed.

However, if the synthesized image L1 is used for the focus detection evaluation, the image state changes from the original thin line to the thick line. Consequently, if the synthesized image L1 is used for the focus detection evaluation, the focus detection evaluation is performed with the object image whose high-frequency components are lost. As a result, the accuracy of the focus detection evaluation is decreased.

In FIG. 3B, to solve the problem (1), instead of the image combining processing in FIG. 3A, the alignment processing of the horizontal segment images L0 of the divided frames SF1 to SF4 in the vertical direction is performed.

After the execution of the image alignment processing illustrated in FIG. 3B, if the image combining processing is performed, the generated horizontal segment image becomes L1 as illustrated in FIG. 4B.

As a result, on the divided frames, the deterioration of the sharp horizontal segment image obtained in the high-speed exposure time can be eliminated. Further, based on the synthesized image obtained by combining the aligned divided frames SF1 to SF4, the focus detection is performed. This can prevent decrease in the focus detection accuracy.

If the frame image is used for recording, however, a new problem occurs.

(3) The one synthesized frame obtained by optimally combining the images for focus detection causes, if the one synthesized frame is switched to a next one synthesized frame to which the image processing is performed, the position of the sharp object image discretely changes. As a result, the object image makes an impression of so-called jumpy discrete movements (digital movements) on the viewer of the video. This results in a low quality moving image as an image for recording.

To prevent the object image from becoming the image of so-called jumpy discrete movements, the processing described in FIG. 3A is performed on the recording image. The synthesized image obtained as a result of the processing described in FIG. 3A is recorded as a recording image. The processing can reduce the phenomenon of the object image of so-called jumpy discrete movements, and provide the good-quality recording moving image.

As described above, performing the different image combining processes in accordance with the intended use can reduce the phenomenon of the object image of the so-called jumpy discrete movements in video recording.

In the image combining processing in FIG. 3A, the recording image is generated without performing the alignment processing of the object images. In the processing, however, the image combining processing may be performed at an accuracy lower than that in the image alignment processing in generating the focus detection evaluation image in FIG. 3B to generate a recording image.

Since the image alignment accuracy is high in generating the focus detection evaluation image, the focus detection accuracy can be increased. Meanwhile, since the image alignment accuracy in generating the recording image is low, or the image alignment is not performed, the phenomenon of the object image of the so-called jumpy discrete movements in video recording can be reduced. These processes can provide the good-quality recording moving image.

In addition to the accuracy in the image alignment processing, the number of image frames to be synthesized may be changed in the recording image combining processing and the focus detection evaluation image combining processing to different numbers respectively. In such a case, the number of image frames used for generation of a recording image is lower than the number of image frames used for generation of a focus detection evaluation image. The change of the number of image frames used for generation of a synthesized image can restrain the accuracy in the recording image alignment processing.

For example, two image frames to be used for the recording image alignment combining processing can be set to the number of image frames to be used for the focus detection evaluation image alignment combining processing. In other words, when the recording image combining processing is performed, one frame is divided into two frames, and the frames are synthesized. On the other hand, in the image combining processing for focus detection evaluation, one frame is divided into eight frames, and the divided frames are synthesized. By the processing, the recording synthesized image is formed by aligning and combining the two divided frames. In this way, since the recording image combining processing is performed using divided two frames are used, the movements of the object are not reduced, and smooth transition to a next frame can be achieved.

For the focus detection evaluation image, the eight divided frames are aligned and synthesized. Therefore, in the synthesized frame, the movements of the object and the camera shake can be adequately reduced. As a result, the focus detection accuracy of the focus detection evaluation image can be maintained at a high level.

The readout processing of the image signals for acquiring the image described in FIGS. 3A and 3B, and FIGS. 4A and 4B is described.

FIG. 5 is a diagram briefly illustrating a readout state of a captured image signal of the image formed on the image sensor 103, with respect to the time axis. For example, FIG. 5 illustrates a readout state of an image signal by a general rolling shutter method in which the image information of the image sensor 103 in the horizontal line is vertically scanned and read.

In FIG. 5, it is assumed that, to a recording frame 201 and a recording frame 202, one frame length for recording is set to 1/30 second. Further, it is assumed that the recording frame 201 and the recording frame 202 are controlled to be one frame image signal read out respectively.

Divided frames 203 to 206 are divided frame images obtained by dividing the first recording frame 201 into four frames. In other words, the image sensor 103 reads the images at a four times faster readout speed (one divided frame rate of 1/120 second). Meanwhile, divided frames 207 to 210 are divided frame images obtained by dividing the second recording frame 202 into four frames. In other words, the image sensor 103 reads the images at a four times faster readout speed (one divided frame rate of 1/120 second).

In such a case, for the focus detection evaluation, it is not necessary to refer to all image ranges in the object that are being captured, and only data in the first image evaluation range FA and the second image evaluation range FR in FIG. 2 is to be referred to.

As described above, partially reading the image signal in the image evaluation range of the image of the entire object enables increasing the focus detection accuracy in the specified range, performing the high-speed readout processing, and reducing the calculation load.

In FIG. 5, the first recording frame 201 can be generated by combining the plurality of image frames of the divided frames 203 to 206. Further, the second recording frame 202 can be generated by combining the plurality of image frames of the divided frames 207 to 210.

The configuration for the partial object readout in the specified ranges of the recording image range is described in documents, for example, Japanese Patent Application Laid-Open No. 2009-207012.

Figure 6:
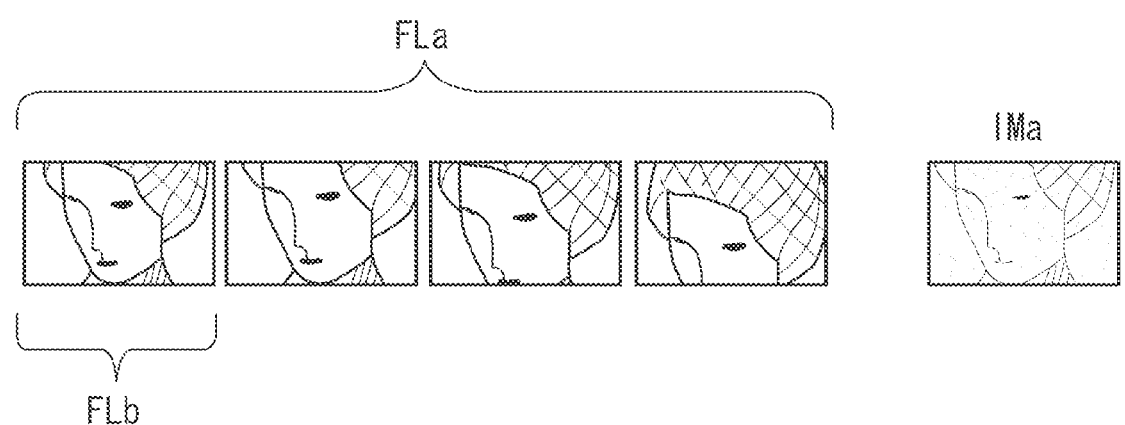
FIG. 6 illustrates images generated in the image combining processing without the image alignment processing in a first image evaluation range FA.
Figure 7:
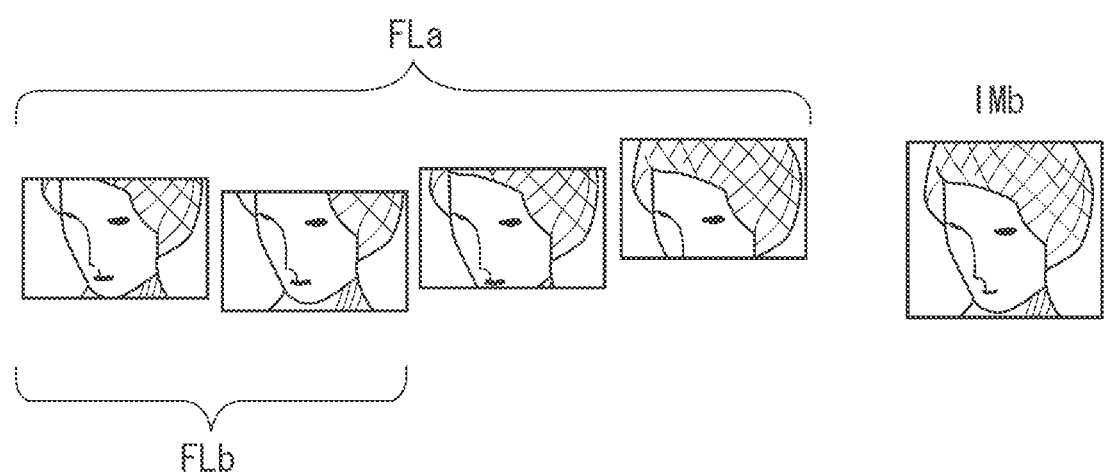
FIG. 7 illustrates images generated in the image combining processing with the image alignment processing in the first image evaluation range FA.

FIGS. 6 and 7 illustrate the first image evaluation range FA illustrated in FIG. 2 from the images obtained in the divided frames 203 to 206 in FIG. 6. In this example, the person who is being captured is moving at a high speed in the vertical direction.

A one divided frame image FLb is a divided frame image obtained by dividing a synthesized frame image FLa (the recording frame length of 1/30 second) into four frames. It is assumed that the one divided frame image FLb is obtained by a high-speed divided frame readout of 1/120 second. However, it has been set so that a proper amount of exposure can be obtained at the recording frame length of 1/30 second. Therefore, the exposure state of the individual divided frame images FLb is under.

To a moving object, images are captured at a high-speed shutter (high frame rate), and consequently, image blurs of the moving object are reduced.

FIG. 6 illustrates an image IMa obtained by combining the images without performing the image alignment processing. The image IMa synthesized without performing the image alignment processing is equivalent to an image obtained by performing image readout of one frame at a low speed of 1/30 second that is the recording frame length. Consequently, the fast-moving object causes an image blur in the image IMa synthesized without performing the image alignment processing.

Meanwhile, FIG. 7 illustrates an image IMb obtained by using the eyes of the person as a reference (target in the image combining processing), and performing the alignment and combining processing. To facilitate the understanding of the image alignment method, the positions of the eyes of the person are used as the reference to perform the alignment processing.

In the individual divided frames, after the images with less image blur are aligned, the image combining processing is performed. Consequently, as compared to the image IMa obtained without performing the image alignment processing, the image IMb obtained by performing the alignment and combining processing becomes a sharp image having less blur and proper exposure amount.

By using the aligned and synthesized image IMb for focus detection evaluation such as a contrast evaluation and phase difference evaluation, a high-accuracy focus detection can be performed.

Hereinbelow, processing for correcting image blur components causing image quality reduction in reproduction images viewed when the user plays back the recorded images is described.

Figure 8A:
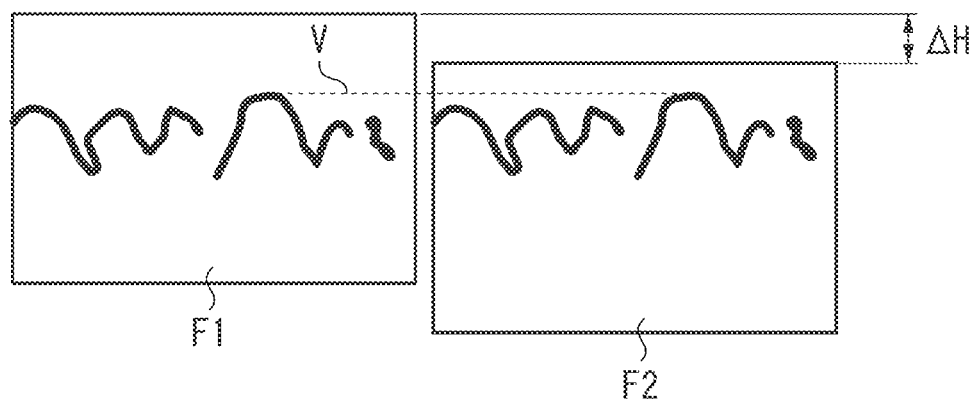
FIGS. 8A and 8B illustrate an amount of movement of the object due to camera shake in a second image evaluation range FR and states where recording image correction processing is performed.

In FIG. 8A, an image F1 corresponds to the frame 201 in FIG. 5. In other words, the image F1 is the first frame obtained by performing the image combining processing without performing the image alignment processing to the divided frames 203 to 206. An image F2 corresponds to the frame 202. An object position V to be a reference in the image F1 and image F2 indicates, for the sake of simplicity, a reference position in the vertical direction. An amount of movement ΔH is an amount of movement (amount of image blur) of the object position V to be the reference.

Figure 8B:
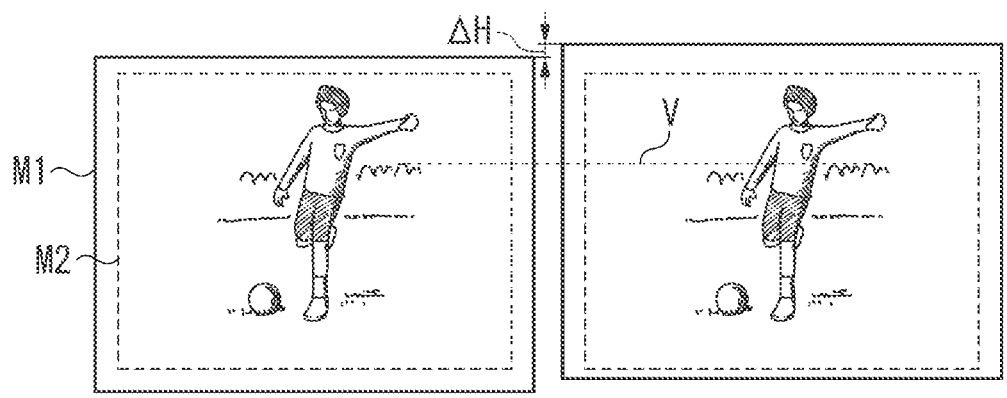

In FIG. 8B, a range M1 is an effective screen range for reading an image. A range M2 is a range for clipping the image to remove the change in the image capturing range due to the image movement of the image blur amount ΔH and for performing recording as a recording image.

The image correction processing for detecting the amount of movement ΔH and correcting the blur can prevent the occurrence of the blurred image. Therefore, performing the above-described processing can prevent decrease in the focus detection accuracy and can remove the image blur.

Further, images suitable for recording moving images in which discrete movements of the object are reduced and the problems of (1) to (3) are solved, can be obtained.

FIG. 9 is a flowchart schematically illustrating the focus detection operation in the imaging apparatus illustrated in FIG. 1.

A focus detection object range 1 corresponds to the first image evaluation range FA including the moving object to be focused in FIG. 2. An image blur detection object range 2 is an object range in a motionless state, and corresponds to the second image evaluation range FR in FIG. 2. The image blur detection object range 2 is specifying an object range in a motionless state to detect an object blur caused by small movements of the imaging apparatus. START is a state where an image capturing start operation is performed.

After the start of image capturing, in step S101, the image combining unit for focus detection evaluation 112 determines the focus detection object range 1 corresponding to the first image evaluation range FA in FIG. 2.

In step S102, the recording image combining unit 109 determines the image blur detection object range 2 for detecting an amount of image blur due to slight movements of the imaging apparatus caused by the image capturing with the imaging apparatus held by hand as illustrated in the second image evaluation range FR in FIG. 2.

In step S103, the image combining unit for focus detection evaluation 112 acquires images in the focus detection object range 1. In the state the evaluation image range is being determined in step S101, as described referring to FIG. 5, images are acquired in divided frames obtained by dividing one frame length for recording into a plurality of frame lengths. In step S104, the recording image combining unit 109 acquires images in the focus detection object range 2.

In step S105, after the image acquisition in the object range 1 and object range 2 is performed, the recording image combining unit 109 performs the image alignment processing on the object range 1. In step S106, the recording image combining unit 109 performs the image combining processing to the images aligned in step S105. In step S107, the focus detection evaluation unit 113 performs the focus detection evaluation processing on the acquired synthesized image.

In step S108, the focus determination unit 114 determines whether the image is in an in-focus state based on the focus detection evaluation result obtained in step S107. The focus determination unit 114, in the focus detection evaluation, evaluates a contrast value of the object in a contrast detection method. Meanwhile, the focus determination unit 114, in the focus detection evaluation, evaluates a correlation value in a phase detection method.

In step S108, if it is determined that the image is not in an in-focus state (NO in step S108), then in step S109, the focus drive unit 115 drives the focus lens to perform focusing operation. In the flowchart of FIG. 9, in step S109, the driving processing of the focus lens is performed, and the process proceeds to next step S110. The focus drive unit 115 can, however, during the processing relating to the image blur detection object range 2 performed in step S111 and after, perform the driving processing of the focus lens in parallel.

In step S110, the recording image combining unit 109 detects an amount of blur of the images from the images in the object range 2. Specifically, as described in FIGS. 8A and 8B, the recording image combining unit 109 detects a change in the movements in the images of the stationary object and detects an amount of image blur due to the slight movement state of the imaging apparatus.

In step S111, the recording image combining unit 109 performs the alignment processing of the overall images to be used for recording and display based on the amount of image blur detected in step S110. From the aligned images, the image blur components are removed.

In step S113, the recording image generation unit 110 performs the clipping processing of the overall image to remove part in which all the images to be synthesized do not overlap with each other. The clipping method includes, for example, a method of clipping a region common in all images and performing scaling processing to adjust to a size suitable for a recording image or display image. Alternatively, in another method, a first image is used as a reference image, and the range can be set as a clipping range. In such a case, depending on the ranges, the number of images to be synthesized differs, however, by performing addition and averaging processing to synthesize the images, unevenness in brightness can be reduced.

In step S114, the image recording unit 111 performs the image recording processing.

In step S115, if an instruction to end the image capturing is issued (YES in step S115), the processing is finished. If the image capturing is to be continued (NO in step S115), the processes returns to step S103 to perform a series of focusing processing and a series of recording processing of the images.

In FIG. 9, in the description of the flowchart, the processing for removing the image blur due to slight movements of the imaging apparatus is included. Alternatively, for example, instead of performing the image comparison, the blur amount detection unit in step S110 can be replaced by a blur detection sensor.

In a case where it is not necessary to perform the image blur removal, the processing in steps S104, S110, S111, and S113 can be omitted.

As described above, the image combining unit for focus detection evaluation 112 (the first image combining unit) and the recording image combining unit 109 (the second image combining unit) perform different alignment processes. As a result, the imaging apparatus capable of increasing the focus detection accuracy and obtaining good-quality recording moving images can be achieved.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), Blu-ray Disc (BD)™, etc.), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2012-086563 filed Apr. 5, 2012, which is hereby incorporated by reference herein in its entirety.

What is claimed is:

1. An image processing apparatus comprising:
an image acquisition unit configured to acquire an image from an imaging unit for acquiring an image signal from an object;
a first image combining unit configured to align and synthesize a plurality of image frames acquired by the acquisition unit at a predetermined accuracy, wherein a synthesized image acquired by the first image combining unit is used for focus detection; and
a second image combining unit configured to align and synthesize a plurality of image frames acquired by the imaging unit at an accuracy lower than the accuracy of the first image combining unit, or synthesize the plurality of image frames without performing alignment processing, wherein a synthesized image acquired by the second image combining unit is recorded or displayed as a captured image.

2. The image processing apparatus according to claim 1, wherein a number of image frames to be synthesized by the second image combining unit is smaller than a number of image frames synthesized by the first image combining unit.

3. The image processing apparatus according to claim 1, wherein a target of the first image combining unit in image combining processing is a moving object, and a target of the second image combining unit in image combining processing is a stationary object.

4. The image processing apparatus according to claim 1, wherein a number of the image frames to be used for alignment processing by the second image combining unit is smaller than a number of image frames to be used for alignment processing by the first image combining unit.

5. An imaging apparatus comprising:
- an imaging unit configured to acquire an image signal of an object;
- a first image combining unit configured to align and synthesize a plurality of image frames generated from a signal output from the imaging unit at a predetermined accuracy, wherein a synthesized image acquired by the first image combining unit is used for focus detection; and
- a second image combining unit configured to align and synthesize a plurality of image frames generated from the signal output from the imaging unit at an accuracy lower than the accuracy in the first image combining unit, or synthesize a plurality of image frames without performing alignment processing, wherein a synthesized image acquired by the second image combining unit is recorded or displayed as a captured image.

6. The imaging apparatus according to claim 5, wherein a number of image frames to be synthesized by the second image combining unit is smaller than a number of image frames to be synthesized by the first image combining unit.

7. The imaging apparatus according to claim 5, wherein a target of the first image combining unit in image combining processing is a moving object, and a target of the second image combining unit in image combining processing is a stationary object.

8. The imaging apparatus according to claim 5, wherein a number of the image frames to be used for alignment processing by the second image combining unit is smaller than a number of image frames to be used for alignment processing by the first image combining unit.

9. A method of controlling an image processing apparatus configured to perform image processing on a plurality of image frames captured by an imaging apparatus including an imaging unit configured to acquire an image signal of an object, the method comprising:
- a first image combining step for aligning and combining image frames acquired by the imaging unit at a predetermined accuracy, wherein a synthesized image acquired in the first image combining step is used for focus detection; and
- a second image combining step for aligning and combining a plurality of image frames acquired by the imaging unit at an accuracy lower than the accuracy in the first image combining step, or combining a plurality of image frames without performing the alignment processing, wherein a synthesized image acquired in the second image combining step is recorded or displayed as a shot image.

10. A method of controlling an imaging apparatus including an imaging unit configured to acquire an image signal of an object, the method comprising:
- a first image combining step for aligning and combining a plurality of image frames generated from the signal output from the imaging unit at a predetermined accuracy, wherein a synthesized image acquired in the first image combining step is used for focus detection; and
- a second image combining step for aligning and combining the plurality of image frames generated from the signal output from the imaging unit at an accuracy lower than the accuracy in the first image combining step, or combining image frames without performing alignment processing, wherein a synthesized image acquired in the second image combining step is recorded or displayed as a captured image.

* * * * *